(12) United States Patent
Clark et al.

(10) Patent No.: US 6,624,108 B1
(45) Date of Patent: Sep. 23, 2003

(54) VITRIFIED CARBON COMPOSITIONS

(75) Inventors: Duncan Guy Clark, Berkshire (GB); Mark Christopher Turpin, Leicestershire (GB); Ian Whyte, Bucks (GB); Graham Edward Cooley, Nr Faringdon (GB)

(73) Assignee: Regenesys Technologies Limited, Wilts (GB)

( * ) Notice: Subject to any disclaimer, the term of this patent is extended or adjusted under 35 U.S.C. 154(b) by 0 days.

(21) Appl. No.: 09/787,278

(22) PCT Filed: Sep. 7, 1999

(86) PCT No.: PCT/GB99/02961

§ 371 (c)(1),
(2), (4) Date: Feb. 20, 2002

(87) PCT Pub. No.: WO00/15576

PCT Pub. Date: Mar. 23, 2000

(30) Foreign Application Priority Data

Sep. 15, 1998 (GB) .............................................. 9820109

(51) Int. Cl.[7] .......................... B01J 21/18; B01J 23/02; H01M 4/88; H01M 4/02; C01G 1/04
(52) U.S. Cl. ....................... 502/182; 502/101; 502/183; 502/184; 502/185; 502/418; 423/417; 423/418; 423/447.5; 429/209; 429/218.1; 429/220; 429/221; 429/223; 429/225; 429/226; 429/228; 429/229; 429/231.8
(58) Field of Search .......................... 502/101, 182–185, 502/418; 423/417, 418, 447.5; 429/209, 218.1, 220, 221, 223, 225, 226, 228, 229, 231.8

(56) References Cited

U.S. PATENT DOCUMENTS

| 3,847,674 | A | | 11/1974 | Kegelman ................... 136/100 |
|---|---|---|---|---|
| 3,979,329 | A | * | 9/1976 | Cooper ........................ 252/422 |
| 4,048,715 | A | * | 9/1977 | Vissers et al. ............. 29/623.5 |
| 4,086,404 | A | * | 4/1978 | Vissers et al. .............. 429/220 |
| 4,136,428 | A | | 1/1979 | Godsey et al. ............. 29/157.4 |
| 4,235,695 | A | * | 11/1980 | De Nora et al. ............. 204/268 |
| 4,396,669 | A | | 8/1983 | Cariou ........................ 428/280 |
| 4,485,154 | A | | 11/1984 | Remick et al. ................ 429/14 |
| 4,579,632 | A | | 4/1986 | Brotz ............................. 204/9 |
| 4,626,569 | A | * | 12/1986 | Waitkus et al. .............. 524/541 |
| 4,668,496 | A | * | 5/1987 | Korb et al. .................. 423/445 |
| 4,806,290 | A | * | 2/1989 | Hopper et al. ................. 264/28 |
| 4,851,285 | A | | 7/1989 | Brotz ....................... 428/304.4 |

FOREIGN PATENT DOCUMENTS

| EP | 328135 | 8/1989 |
|---|---|---|
| GB | 1330252 | 9/1973 |
| GB | 1464998 | 2/1977 |
| GB | 1482850 | 8/1977 |
| GB | 2042250 | 9/1980 |
| WO | 9304220 | 3/1993 |
| WO | 9419515 | 9/1994 |

OTHER PUBLICATIONS

New Carbon Composites Containing Ultrafine Fe, Co or Ni Particles 1. Facile Synthesis by Pyrolysis of Organometallic Polymers, Yasuda et al Aug. 1990, Journal of Inorganic and Organometallic Polymers, vol. 1, No. 1, 1991.

* cited by examiner

*Primary Examiner*—Mark L. Bell
*Assistant Examiner*—Patricia L. Hailey
(74) *Attorney, Agent, or Firm*—Antonelli, Terry, Stout & Kraus, LLP

(57) ABSTRACT

Reticulated vitrified carbon compositions which contain particles of Cu, Sn, Zn, Pb, Ni, Fe, or alloys or mixtures thereof dispersed therein and reticulated vitreous carbon compositions wherein some or all of said metal or alloy particles have been converted into salts or mixtures of salts thereof. Processes for the preparation of such compositions.

59 Claims, No Drawings

VITRIFIED CARBON COMPOSITIONS

The present invention relates to reticulated vitrified carbon compositions which contain a metal and/or a metal salt dispersed therein, in particular containing up to 1000 mg/cm$^3$ of Cu, Sn, Zn, Pb, Ni, Fe, or alloys or mixtures thereof and/or salts or mixtures of salts thereof, dispersed therein, and to processes for the preparation of such vitrified carbon compositions.

Electrodes which are used in energy storage and power generation systems may be surfaced with graphite. However, in some aggressive environments such as in the cell described in U.S. Pat. No. 4,485,154 which uses a sulfide-polysulfide catholyte system and an iodide-polyiodide, chloride-chlorine or bromide-bromine anolyte system, the anolyte may migrate into the graphite of the electrode and destroy or damage its integrity. It is therefore desirable for the electrode used in such a cell to be resistant to such aggressive environments.

It is also desirable for the electrode for use with the sulfide-polysulfide electrolyte described above to be metal-containing because some or all of the metal can be converted to a salt, preferably a sulfide which acts as an electrocatalyst for the sulfide-polysulfide catholyte system. Such an electrode must be chemically, electrochemically and physically stable in the electrolyte and have a high surface area.

It is known that carbon compositions may be coated with a metal plating. U.S. Pat. No. 4,851,285 discloses a cellular carbon foam with metallic plating on the interior of its cells and various methods for the production thereof. U.S. Pat. No. 4,136,428 discloses a method for producing an improved heat transfer surface on a metal tube by electroplating a thin metal coating onto a very porous reticulated organic foam layer which has been wound onto the metal tube, said foam having been precoated with graphite. The organic foam may optionally be pyrolysed. U.S. Pat. No. 4,579,632 discloses a method of electroforming by:

(i) creating the shape to be electro-formed of a polystyrene or other material,
(ii) coating with a carbonizable resin,
(iii) carbonising the resin and vaporising the internal form, and
(iv) metal plating the resulting structure.

It is also known that glassy carbons containing metal particles can be formed. WO93/04220 discloses glassy carbons including a dispersion of metal particles having a small particle size. The glassy carbons are formed by heating a metal complexed to a molecule for a sufficient period of time for the molecule to cross-link to provide glassy carbon. A similar method of forming carbon composites containing ultrafine metal particles by pyrolysis of organometallic polymers is disclosed in a paper by H. Yasuda, S. Miyanaga, A. Nakamura and H. Sakai (Journal of Inorganic and Organometallic Polymers, Vol 1, No 1, 1991).

Incorporating metal into the structure of the carbon surface of an electrode is difficult and plating of the carbon surface by the methods known in the art results in mechanical instability because the metal particles are not mechanically locked into the carbon surface. Poor adherence of the metal plate also causes problems when the metal is converted into a catalytically active salt such as a metal sulfide. Considerable volumetric expansion occurs on conversion putting strain on the bonding at the metal sulfide/carbon interface leading to a loss of catalyst. The use of organometallic polymers for forming vitrified carbon compositions with metal particles disperse therein necessitates synthesis of the precursor organometallics which is an expensive and time-consuming process.

Electrodes containing electrocatalytic species such as copper sulfide, and methods for their production are also known. GB-A-1330252 discloses an electrode structure comprising copper sulfide with a porosity of at least 50% and a resistivity of less than 0.5 ohm-cm together with a process for forming such an electrode from a homogeneous mixture of finely divided particulate sulfur and finely divided particulate copper metal. U.S. Pat. No. 3,847,674 discloses similar electrode structures and methods for their formation and also suggests that the cathodes may be prepared in intimate physical and electrical contact with a conductor, including carbon meshes. GB-A-1464998 discloses a lithium-molten salt cell with a transition metal chalcogenide positive electrode. The electrode may be formed by impregnating a lattice of porous graphite with a slurry of the chalcogenide in a liquid such as alcohol, then baking to evaporate the liquid and leave the chalcogenide distributed throughout the interstices of the porous graphite matrix. GB-A-1482850 discloses an electrode comprising a porous compressible felt matrix formed from resilient carbon fibres, said matrix being impregnated with particles of transition metal chalcogenide. The electrode may be formed by placing the porous felt matrix in a suitable container, substantially covering the matrix with finely divided particles of the selected chalcogenide and vibrating the container to cause the finely divided particles of chalcogenide to permeate through the interstices of the porous matrix. GB-A-2042250 discloses catalytically active electrodes for use in polychalcogenide redox systems which comprise, as active material, a sulfide, selenide or telluride, or a mixture thereof, of one or more transition metals, copper or lead. The electrodes may be formed by forming a layer of precursor on a support, such as porous carbon and converting the precursor to the active material. In one method the precursor is a layer of metal formed on the support by electrolysis and converted to the sulfide, selenide or telluride by reaction with a chalcogen-chalcogenide-hydroxide electrolyte composition.

The electrodes described above suffer however from mechanical instability in the aggressive environments of electrochemical cells, such as in the cell described in U.S. Pat. No. 4,485,154. There is therefore a need for improved electrodes for use with such systems.

We have now developed a reticulated vitreous carbon body containing Cu, Sn, Zn, Pb, Ni, Fe, or alloys or mixtures thereof and/or salts or mixtures of salts thereof, dispersed therein, which may be used as an electrode or electrode surfacing material and which is more resistant to the aggressive environments discussed above and exhibits excellent electrocatalytic activity.

Accordingly, in one aspect, the present invention provides a reticulated vitrified carbon composition which contains particles of Cu, Sn, Zn, Pb, Ni, Fe, or alloys or mixtures thereof dispersed therein.

By the term "reticulated" as used herein is meant a three dimensional netlike structure. Preferably, such a structure has a porosity of from 10 to 200 pores per linear inch. Preferably, such a structure also has a total void space of 50%, more preferably 80%, of the total volume of the structure.

By the term "vitrified carbon" as used herein is meant carbon which is in an amorphous glassy form which is produced by the pyrolysis of certain polymers.

The reticulated vitrified carbon composition preferably comprises up to approximately 1000 mg/cm$^3$, more preferably from 30 to 130 mg/cm$^3$, of the said metal or alloy particles dispersed therein.

Preferably the metal or alloy particles are substantially spherical in shape. This shape provides an advantage when the composition is cut into thin sheets, for example for use in electrochemical cells. This shape of particle does not result in damage to the surrounding vitrified carbon structure on cutting.

Whilst not wishing to be bound by theory, it is believed that spherical particles are more easily dislodged from their position in the vitreous carbon structure than non-spherical particles. Thus, when contacted by a cutting edge they do not grip the vitreous carbon so tightly, causing it to fracture, but rather dislodge from their position without causing damage.

The preferred metal for use in the present invention is Cu which has particularly good conductive properties and which can subsequently be converted to the electrocatalytic salt copper sulfide.

The metal or alloy particles which are used in the present invention preferably have a particle size less than 100 $\mu$m, more preferably less than 10 $\mu$m. Particles with size above 100 $\mu$m are not preferred because they are more difficult to disperse in the composition formed in step (i) of the method disclosed below for forming the reticulated vitrified structure. Also, when using the foam impregnation method described below, particles larger than 100 $\mu$m do not penetrate the foam. Particles with a size less than 10 $\mu$m are preferred because they are easily suspended in the composition formed in step (i) of the method disclosed below for forming the vitrified structure. Preferably the particles have a mean particle size in the range of from 1 $\mu$m to 100 $\mu$m, more preferably 1 $\mu$m to 10 $\mu$m.

Although an alloy when used is preferably an alloy of two or more of Cu, Sn, Zn, Pb, Ni and Fe, alloys of one of these metals with another metal such as Mo or Ti are also contemplated within the scope of the present invention. An advantage of the use of an alloy is that the melting point of the alloy can be tailored to suit the conditions used for forming the composition. In particular it is advantageous that the melting point should be above the temperature of pyrolysis in the process disclosed below.

In a second aspect, the present invention provides a reticulated vitrified carbon composition which contains particles of Cu, Sn, Zn, Pb, Ni, Fe, or alloys or mixtures thereof as defined in the first aspect and wherein some or all of the said metal or alloy particles have been converted into salts or mixtures of salts thereof. Preferably the salt or salts formed is/are electrocatalytically active, more preferably the salt or salts is/are chalcogenides, even more preferably sulfides and most preferably copper sulfide.

The percentage of converted metal and/or metal alloy is commonly in the range of from 50–100% and preferably 90–100%.

The present invention also includes within its scope various processes for the preparation of the reticulated vitrified carbon compositions described above and these are detailed below.

Accordingly, in a third aspect, the present invention provides a process for the preparation of a reticulated vitrified carbon composition according to the first aspect which contains particles of Cu, Sn, Zn, Pb, Ni, Fe, or alloys or mixtures thereof dispersed therein, which process comprises the steps of:

(i) preparing a reticulated composition comprising:
(a) a polymer, or one or more polymer precursors, which will form vitrified carbon on pyrolysis in admixture with
(b) Cu, Sn, Zn, Pb, Ni, Fe, or alloys or mixtures thereof, or salts or complexes thereof, in powder form or as a solution or a suspension thereof; and (ii) when a polymer is used in (i), heating the reticulated composition prepared in step (i) to a temperature at or above that at which the said polymer will pyrolyse to form vitrified carbon; or (iii) when a polymer precursor is used in (i), curing the said polymer precursor to form a polymer and heating the resultant reticulated composition to a temperature at or above that at which it will pyrolyse to form vitrified carbon.

The polymer or polymer precursor for use in step (i) may be provided in powder form, liquid form or in solution in a suitable solvent. Monomers which may be used as the polymer precursors in the present invention include any resins which form a polymer which gives a high yield of carbon when pyrolysed, i.e. greater than 20% by weight of carbon based on the pre-pyrolysed weight of the polymer. Examples are furfuryl alcohol or furfural, both of which may be polymerised to form furan polymers. Other examples of suitable polymer precursors for use in the present invention are epoxy resins and phenolic resins such as novolac or resole resins. The curing of said polymer precursors in step (iii) may be assisted by the addition in step (i) of a curing agent such as hexamethylenetetramine. Polymers which may be used include any which give a high yield of carbon when pyrolysed. Examples of polymers which may be used include furan polymers prepared by the homopolymerisation of furfuryl alcohol or furfural, or by the copolymerisation of furfuryl alcohol or furfural with another co-monomer, for example a ketone.

The metal or alloy which is incorporated into the composition prepared in step (i) may be in the form of: a powdered metal or powdered alloy, in the form of a solid powdered metal salt or metal complex, a suspension of a powdered metal, powdered alloy, powdered metal salt or powdered metal complex in an appropriate solvent, or in the form of a solution of a metal salt or metal complex in an appropriate solvent. Any metal salt or complex with a volatile counter-ion is suitable. An example of a metal salt in an appropriate solvent is $CuCl_2$ in solution in methanol. An example of a metal complex which may be used is copper acetylacetonate.

The temperature at which pyrolysis is conducted will depend upon the selection of polymer or polymer precursor. However, pyrolysis is typically conducted at a temperature in the range of from 700 to 3000° C., more preferably from 900 to 1200° C.

The reticulated composition formed in step (i) above may be formed in a number of ways. The manner in which the reticulated composition is formed will depend upon the selection of polymer or polymer precursor and the technique used to incorporate the metal or alloy into the composition.

In one route, the reticulated composition may be formed from fibres, for example by melt processing of the composition followed by the use of appropriate fibre spinning techniques.

In another route, when the composition is in a liquid form or in the form of a solution, the reticulated composition may be formed by using a casting technique such as injection moulding.

A still further processing route is for the composition, when in liquid form or in the form of a solution, to be impregnated into a reticulated foam structure which, on pyrolysis, will vaporise. Suitable reticulated foams may be made from polyurethane or polyether material. The foam typically has a porosity of 10–200 pores per linear inch. By this route a very high surface area reticulated vitrified carbon is prepared on pyrolysing the impregnated reticulated foams with the metal or alloy diposed therein. This processing route is particularly favourable because in the resulting reticulated vitrified carbon composition the metal or metal alloy particles are found to be located predominantly at the surface of the carbon struts with considerable exposure to the open pores of the reticulated structure. This is particularly important if the composition is to be further processed as outlined below to convert some or all of the metal or metal alloy to salts thereof.

An alternative processing route is for a liquid phase composition to be formed into a foam prior to pyrolysis. This may be achieved by injecting gas into the composition prior to and/or during pyrolysis.

It will be understood by those skilled in the art that if a metal or alloy is used in the preparation of the precursor in step (i), then it should preferably have a melting point above the temperature at which the polymer is pyrolysed to form the vitrified carbon. It is advantageous that the metal particles should not melt and therefore lose their spherical shape. If the metal or alloy is in the form of a metal salt or a metal complex then metal salts or metal complexes should generally be used which will decompose to the metal at a temperature below the ultimate pyrolysis temperature of the polymer.

The reticulated vitrified carbon composition formed by any of the process routes outlined above may be subjected to an additional processing step so as to form the composition described above in the second aspect. The additional processing step comprises contacting some or all of the metal particles with suitable reagents to effect conversion to the said metal salts for a time suitable to effect the desired extent of conversion. The extent of conversion depends upon the proportion of the metal or metal alloy particles in the vitrified carbon composition which are available to contact said reagents. Typically the amount of metal or metal alloy converted is in the range of from 50 to 100%, preferably 90 to 100%. Preferably the said reagents are selected to effect conversion to metal chalcogenides, more preferably the reagents are selected to effect conversion to metal sulfides, most preferably the reagent is a polysulphide solution comprising a metal hydroxide, a metal sulfide and sulfur. This process for doping with metal salts is particularly advantageous because the salts so formed are found to have high surface area structures which enhance their ability to behave as catalysts in, for example, electrochemical cell reactions.

The reticulated vitrified carbon compositions of the present invention may be used in the fabrication of electrodes for use in electrochemical cells such as those used for energy storage and power generation. Especially those which utilise a sulfide/polysulfide reaction such as that described in U.S. Pat. No. 4,485,154. For example, an electrode may be surfaced with the reticulated vitreous carbon composition of the present invention by pressing the composition onto the electrode surface. Alternatively, the reticulated vitreous carbon composition of the present invention may be used in the bulk manufacture of electrodes.

The reticulated vitreous carbon compositions of the first aspect of the present invention possess the advantage that the particulate metal or alloy is encapsulated within the vitreous carbon matrix and thus is very stable whilst also exhibiting high electrical conductivity. Furthermore, in the second aspect of the present invention certain salts of metals, such as copper sulfide, provide a catalytic effect at the surface of an electrode comprising such a reticulated vitreous carbon composition and this may be particularly advantageous. Tests on electrocatalytic behaviour of the compositions of the present invention show that they exhibit catalytic activity for a longer period of time than most other copper doped materials.

The present invention will be further described with reference to the following Examples.

EXAMPLES 1 to 6

1 and 4 Are Comparative Examples

A solution of phenolic resin (BITREZ P264) in methanol was prepared, comprising 200 g/L resin and 7.5 g/L hexamethylenetetramine. A similar solution was prepared comprising 200 g/L resin and 15 g/L hexamethylenetetramine. Each of the resin solutions were doped using a spheroidal copper powder added to the resin at loadings of 0, 150, and 300 g/L (the copper powder was obtained from Aldrich Chemical Co. and was listed as having a particle size of less than 10 $\mu$m, particle size analysis by a Coulter Multisizer indicated a mean particle size of 7.9 $\mu$m). This gave six compositions which were each then treated as follows. A piece of polyurethane foam of approximate dimensions 1.5×1.5×10 cm was placed in a tall receptacle and the stirred suspension of metal in resin was poured over to completely cover the foam. The receptacle was quickly inverted and allowed to free drain for about 10 minutes. At this point the foam was noted to swell in the resin solution, with an approximate doubling of the foam volume. The foam was removed from the receptacle and allowed to further drain onto absorbent paper for about 30 minutes, during which time the methanol solvent was allowed to evaporate. The foam was finally dried in an oven at 100–120° C., at which temperature the hexamethylenetetramine decomposed to yield formaldehyde and cured the phenolic resin. The now hard block of phenolic infiltrated foam was fired under an inert nitrogen atmosphere to 1050° C. with a ramp rate of 200° C./Hr to yield the doped reticulated vitreous carbon. The results for the six different compositions are given in the table below (calculation of the g/cm$^3$ and cm$^3$/cm$^3$ of Cu in the fired foam was based on an undoped carbon foam density of approximately 50 mg/cm$^3$):

| | HMTA g/L | Cu g/l | Initial foam weight g | Fired foam weight g | Cu in fired foam wt % | Cu in fired foam g/cm$^3$ | Cu in fired foam cm$^3$/cm$^3$ |
|---|---|---|---|---|---|---|---|
| 1 | 7.5 | 0 | 0.6257 | 0.3753 | 0 | 0 | 0 |
| 2 | 7.5 | 150 | 0.6612 | 0.9269 | 57 | 0.067 | 0.0075 |
| 3 | 7.5 | 300 | 0.6552 | 1.2371 | 68 | 0.107 | 0.0120 |
| 4 | 15 | 0 | 0.5894 | 0.4155 | 0 | 0 | 0 |
| 5 | 15 | 150 | 0.5994 | 0.9892 | 57 | 0.067 | 0.0075 |
| 6 | 15 | 300 | 0.5785 | 1.4171 | 71 | 0.122 | 0.0137 |

Polished sections of material were prepared by embedding the carbonised foam in an epoxy resin, grinding away the surface layer and then polishing to a 1 $\mu$m finish-on a rotary lapping plate. The sections were then examined by microscopy.

EXAMPLES 7 to 10

A solution of phenolic resin (BITREZ P264) in methanol was prepared, comprising 200 g/L resin and 7.5 g/L hexamethylenetetramine. A similar solution was prepared comprising 200 g/L resin and 15 g/L hexamethylenetetramine. Each of the resin solutions were doped using copper (II) chloride powder added to the resin at loadings of 0, 150 and 300 g/L. This gave six compositions which were each then treated as described above for Examples 1 to 6. The results for the six different compositions are given in the table below:

| | HMTA g/L | CuCl$_2$ g/L | Initial foam weight g | Fired foam weight g | Cu in fired foam wt % | Cu in fired foam g/cm$^3$ | Cu in fired foam cm$^3$/cm$^3$ |
|---|---|---|---|---|---|---|---|
| 1 | 7.5 | 0 | 0.6257 | 0.3753 | 0 | 0 | 0 |
| 7 | 7.5 | 150 | 0.6618 | 0.7767 | 49 | 0.048 | 0.0054 |
| 8 | 7.5 | 300 | 0.6158 | 0.9366 | 61 | 0.077 | 0.0086 |
| 4 | 15 | 0 | 0.5894 | 0.4155 | 0 | 0 | 0 |
| 9 | 15 | 150 | 0.5695 | 0.6672 | 40 | 0.034 | 0.0038 |
| 10 | 15 | 300 | 0.5753 | 0.9199 | 56 | 0.064 | 0.0072 |

Polished sections of material were prepared by embedding the carbonised foam in an epoxy resin, grinding away the surface layer and then polishing to a 1 μm finish on a rotary lapping plate. The sections were then examined by microscopy.

EXAMPLE 11

A doped reticulated vitreous carbon structure, was sulfided by dipping the foam into a solution containing 1M sodium hydroxide, 1.3M sodium sulfide and 2.2M sulfur. The sample was left to sulfide for a period of about 500 hours. The sulfided sample was removed, washed in copious distilled water and dried at 100° C. Polished samples were prepared as in Example 1 and examined by microscopy.

What is claimed is:

1. A reticulated vitrified carbon composition which contains particles of at least one metal selected from the group consisting of Cu, Sn, Zn, Pb, Ni and Fe, alloys or mixtures of said at least one metal, or salt or salt mixtures of said at least one metal dispersed therein, wherein said reticulated vitrified carbon composition is formed from:
   a) a polymer, or one or more polymer precursors, which form(s) vitrified carbon in admixture with
   b) at least one metal selected from the group consisting of Cu, Sn, Zn, Pb, Ni and Fe, or alloys or mixtures of said at least one metal, or salts or complexes of said at least one metal, in powder form or as a solution or a suspension thereof.

2. A reticulated vitrified carbon composition as claimed in claim 1 which comprises up to approximately 1000 mg/cm$^3$ of the particles dispersed therein.

3. A reticulated vitrified carbon composition as claimed in claim 1 which comprises from 30 to 130 mg/cm$^3$ of the particles dispersed therein.

4. A reticulated vitrified carbon composition as claimed in claim 1 wherein the particles are substantially spherical in shape.

5. A reticulated vitrified carbon composition as claimed in claim 1 wherein the mean particle size of the particles is less than approximately 100 μm.

6. A reticulated vitrified carbon composition as claimed in claim 1 wherein the mean particle size of the particles is less than approximately 10 μm.

7. A reticulated vitrified carbon composition as claimed in claim 1 wherein the said metal is copper.

8. A reticulated vitrified carbon composition as claimed in claim 1 wherein some or all of said metal or alloy particles have been converted into salts or mixtures of salts thereof.

9. A reticulated vitrified carbon composition as claimed in claim 8 wherein the salt or salts formed is/are electrocatalytically active.

10. A reticulated vitrified carbon composition as claimed in claim 8 wherein the salt of salts formed is/are chalcogenides.

11. A reticulated vitrified carbon composition as claimed in claim 8 wherein the salt or salts is/are sulfides.

12. A reticulated vitrified carbon composition as claimed in claim 8 wherein the salt is copper sulfide.

13. A reticulated vitrified carbon composition as claimed in claim 8 wherein the percentage of metal or metal alloy converted is in the range of from 50–100%.

14. A reticulated vitrified carbon composition as claimed in claim 8 wherein the percentage of metal or metal alloy converted is in the range of from 90–100%.

15. An electrode comprising a reticulated vitrified carbon composition as claimed in claim 1.

16. An electrochemical cell comprising, as an electrocatalyst or electrode, a reticulated vitrified carbon composition as claimed in claim 1.

17. A reticulated vitrified carbon composition as claimed in claim 1, wherein said alloys consist essentially of two or more metals selected from the group consisting of Cu, Sn, Zn, Pb, Ni and Fe.

18. A reticulated vitrified carbon composition as claimed in claim 1, wherein said alloys comprise at least one metal selected from the group consisting of Cu, Sn, Zn, Pb, Ni and Fe and another metal.

19. A reticulated vitrified carbon composition as claimed in claim 18, wherein said another metal is selected from the group consisting of Mo and Ti.

20. A process for the preparation of a reticulated vitrified carbon composition which contains particles of at least one metal selected from the group consisting of Cu, Sn, Zn, Pb, Ni and Fe, or alloys or mixtures of said at least one metal dispersed therein, which process comprises the steps of:
   (i) preparing a reticulated composition comprising
      (a) a polymer or one or more polymer precursors which will form vitrified carbon on pyrolysis in admixture with
      (b) at least one metal selected from the group consisting of Cu, Sn, Zn, Pb, Ni and Fe, or alloys or mixtures of said at least one metal, or salts or complexes of said at least one metal, in powder form or as a solution or a suspension of said at least one metal; and
   (ii) when a polymer is used in (i), heating the reticulated composition prepared in step (i) to a temperature at or above that at which the said polymer will pyrolyse to form vitrified carbon; or
   (iii) when a polymer precursor is used in (i), curing the said polymer precursor to form a polymer and heating the resultant reticulated composition to a temperature at or above that at which it will pyrolyse to form vitrified carbon.

21. A process as claimed in claim 20 wherein the polymer or polymer precursor are in powder form, liquid form or in solution in a suitable solvent.

22. A process as claimed in claim 20 wherein the polymer which is used to prepare the reticulated composition in step (i) is any polymer which gives yield of greater than 20% by weight of carbon when pyrolysed based on the pre-pyrolysed weight of the polymer.

23. A process as claimed in claim 20 wherein the polymer is a furan polymer prepared by the homopolymerisation of a furfuryl alcohol or furfural, or by the copolymerisation of furfuryl alcohol or furfural with a ketone.

24. A process as claimed in claim 20 wherein the polymer precursor is any resin which forms a polymer precursor is any resin which forms a polymer which gives a yield of greater than 20% by weight of carbon when pyrolysed.

25. A process as claimed in claim 20 wherein the polymer precursor is selected from furfuryl alcohol, furfural epoxy resin, novolac resin or resole resin.

26. A process as claimed in claim 20 wherein a curing agent is added to the composition in step (i).

27. A process according to claim 26 wherein said curing agent is hexamethylenetetramine.

28. A process as claimed in claim 20 wherein the reticulated composition is formed from fibres.

29. A process as claimed in claim 20 wherein the reticulated composition is formed by using a casting technique.

30. A process as claimed in claim 20 wherein the reticulated composition is formed by impregnating the composition into a reticulated polymer foam, the said impregnated reticulated polymer foam then being subject to the pyrolysis in step (ii) or the curing and pyrolysis in step (iii).

31. A process as claimed in claim 20 wherein the reticulated composition is formed from a liquid phase composition by injecting gas into the composition to generate a foam structure prior to and/or during the pyrolysis in step (ii) or the curing and pyrolysis in step (iii).

32. A process as claimed in claim 20 comprising an additional step wherein some or all of the metal or metal alloy particles of the reticulated vitrified carbon composition are contacted with suitable reagents to effect conversion of said metal or metal alloy particles into salts thereof for a time suitable to effect the desired extent of conversion.

33. A process according to claim 32 wherein said reagents effect conversion of the metal or metal alloy particles into chalcogenide salts.

34. A process according to claim 32 wherein said reagents effect conversion of the metal or metal alloy particles into sulfide salts.

35. A process according to claim 32 wherein said metal particles are copper and the salt produced is copper sulfide.

36. A process according to claim 32 wherein the reagent is a polysulfide composition comprising a metal hydroxide, a metal sulfide and sulfur.

37. A process according to claim 32 wherein from 50 to 100% of the metal or metal alloy particles are converted into salts thereof.

38. A process according to claim 32 wherein from 90 to 100% of the metal or metal alloy particles are converted into salts thereof.

39. A reticulated vitrified carbon composition made by the process according to claim 20.

40. A process as claimed in claim 20, wherein said alloys consist essentially of two or more metals selected from the group consisting of Cu, Sn, Zn, Pb, Ni and Fe.

41. A process as claimed in claim 20, wherein said alloys comprise at least one metal selected from the group consisting of Cu, Sn, Zn, Pb, Ni and Fe and another metal.

42. A process as claimed in claim 41, wherein said another metal is selected from the group consisting of Mo and Ti.

43. A reticulated vitrified carbon composition comprising a reticulated vitreous carbon matrix and particles of at least one metal selected from the group consisting of Cu, Sn, Zn, Pb, Ni and Fe, alloys or mixtures of said at least one metal, or a salt or salt mixtures of said at least one metal encapsulated within the reticulated vitreous carbon matrix.

44. A reticulated vitrified carbon composition as claimed in claim 43 which comprises up to approximately 1000 mg/cm$^3$ of the particles dispersed therein.

45. A reticulated vitrified carbon composition as claimed in claim 43 which comprises from 30 to 130 mg/cm$^3$ of the particles dispersed therein.

46. A reticulated vitrified carbon composition as claimed in claim 43 wherein the particles are substantially spherical in shape.

47. A reticulated vitrified carbon composition as claimed in claim 43 wherein the mean particle size of the particles is less than approximately 100 $\mu$m.

48. A reticulated vitrified carbon composition as claimed in claim 43 wherein the mean particle size of the particles is less than approximately 10 $\mu$m.

49. A reticulated vitrified carbon composition as claimed in claim 43 wherein the said metal is copper.

50. A reticulated vitrified carbon composition as claimed in claim 43 wherein some or all of said metal or alloy particles have been converted into salts or mixtures of salts thereof.

51. A reticulated vitrified carbon composition as claimed in claim 50 wherein the salt or salts formed is/are electrocatalytically active.

52. A reticulated vitrified carbon composition as claimed in claim 50 wherein the salt of salts formed is/are chalcogenides.

53. A reticulated vitrified carbon composition as claimed in claim 50 wherein the salt or salts is/are sulfides.

54. A reticulated vitrified carbon composition as claimed in claim 50 wherein the salt is copper sulfide.

55. A reticulated vitrified carbon composition as claimed in claim 50 wherein the percentage of metal or metal alloy converted is in the range of from 50–100%.

56. A reticulated vitrified carbon composition as claimed in claim 50 wherein the percentage of metal or metal alloy converted is in the range of from 90–100%.

57. A reticulated vitrified carbon composition as claimed in claim 43, wherein said alloys consist essentially of two or more metals selected from the group consisting of Cu, Sn, Zn, Pb, Ni and Fe.

58. A reticulated vitrified carbon composition as claimed in claim 43, wherein said alloys comprise at least one metal selected from the group consisting of Cu, Sn, Zn, Pb, Ni and Fe and another metal.

59. A reticulated vitrified carbon composition as claimed in claim 58, wherein said another metal is selected from the group consisting of Mo and Ti.

* * * * *